Patented June 17, 1941

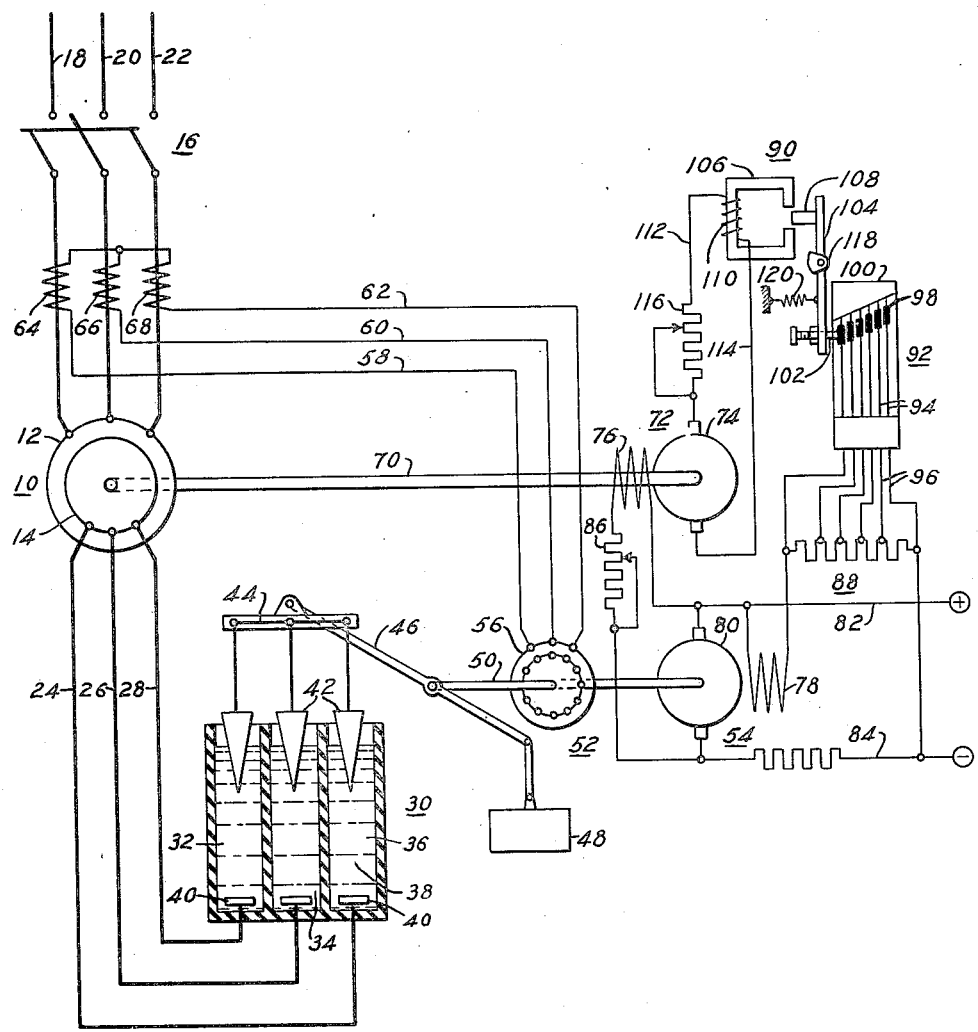

2,246,295

UNITED STATES PATENT OFFICE 2,246,295

CONTROL SYSTEM FOR ELECTRICAL APPARATUS

Willard G. Cook, Wilkinsburg, Pa., assignor to Westinghouse Electric & Manufacturing Company, East Pittsburgh, Pa., a corporation of Pennsylvania Application July 19, 1940, Serial No. 346,301

4 Claims. (Cl. 172—274)

This invention relates to control systems for electrical apparatus, and particularly to control systems for wound rotor motors.

It is well known to control the speed of a wound rotor motor by controlling the amount of resistance in circuit with the rotor windings of the motor. Such control has heretofore been obtained by utilizing a slip regulator connected in circuit relation with the rotor windings, the position of the slip regulator being controlled by the slip of an alternating current torque motor which is responsive to load conditions of the wound rotor motor. This slip regulator method of control is satisfactory for the control of the wound rotor motor under load conditions but it is not adequate where a sensitive control of and a reduction in the idling speed of the wound rotor motor is desired.

An object of this invention is to provide for controlling the operation of a wound rotor motor.

Another object of this invention is to provide a control system for effecting a reduction in the idling speed of a wound rotor motor and maintaining the idling speed at the reduced rate.

A further object of this invention is to provide a control system sensitive to changes in idling speed and changes in load for controlling the operation of a wound rotor motor.

A more specific object of this invention is to provide a control system sensitive to changes in idling speed and changes in load for controlling the operation of a rheostat connected in circuit relation with the rotor windings of a wound rotor motor to effectively reduce the idling speed and control such idling speed of the wound rotor motor while also controlling the operation of the wound rotor motor under load conditions.

Other objects of this invention will become apparent from the following description when taken in conjunction with the accompanying drawing.

In the accompanying drawing there is represented diagrammatically a circuit and coacting apparatus illustrating a preferred embodiment of this invention.

Referring to the drawing, this invention is illustrated by reference to a wound rotor motor 10 having stator windings 12 and rotor windings 14. The stator windings 12 are disposed to be electrically connected to any suitable three-phase power source, not shown, by means of the starting switch 16 and the conductors 18, 20 and 22.

In accordance with usual practice the rotor windings 14 are electrically connected by conductors 24, 26 and 28 to a slip regulator 30. The slip regulator 30 is of usual construction having three cells 32, 34 and 36 electrically insulated from each other and containing a suitable liquid resistance medium 38 such as a mixture of water and salt and a fixed electrode 40 and a movable electrode 42, the position of which can be varied as will be explained more fully hereinafter. The movable electrodes 42 of the three cells are disposed to be moved simultaneously and are electrically connected as by conductor 44 to their associated movable electrodes 42.

The movable electrodes 42 are disposed on one end of a lever arm 46 which carries a counterweight 48 at its other end. The movable electrode assembly is heavier than the counterweight 48 and under the pull of gravity tends to approach the fixed electrodes 40 within the cells. The lever arm 46 is carried by a shaft 50 which is mechanically connected to and disposed to be actuated by an alternating current torque motor 52 and a direct current torque motor 54 under certain predetermined conditions as will be explained more fully hereinafter.

The alternating current torque motor 52 has a stator winding 56 inductively connected through conductors 58, 60 and 62 and coils 64, 66 and 68 to the three-phase power source and is, therefore, energized in accordance with power supplied to the wound rotor motor 10.

Associated with the wound rotor motor 10 and mechanically connected thereto by means of a shaft 70 is a direct current pilot generator 72 having an armature winding 74 and a separately excited field winding 76. Since the generator 72 is driven by the wound rotor motor 10, the voltage delivered by the generator 72 is a direct measure of the speed of the wound rotor motor 10.

The direct current torque motor 54 has a shunt field winding 78 and an armature 80. The armature 80 is mechanically connected by the shaft 50 to the lever arm of the slip regulator 30 and is electrically connected by conductors 82 and 84 to any suitable source of supply of direct current, not shown. The same source of supply of direct current may also be utilized for energizing the field winding 76 of the generator 72, a variable resistor 86 being electrically connected in circuit therewith for manually varying the excitation of the generator. A field rheostat 88 comprising a variable resistor, different portions of which may be shunted, is electrically connected in series circuit relation with the shunt field winding 78 for controlling the excitation of the motor 54.

The field rheostat 88 comprises one of the elements of a rheostat controller which controls the energization of the shunt field winding 78 in response to predetermined conditions regulated by the speed of the wound rotor motor 10 as measured by the voltage delivered by the pilot generator 72. In order to control the number of resistor sections or portions of the field rheostat 88 which is connected in circuit with the shunt field winding 78, a control unit comprising a magnetic structure 90 and a leaf spring assembly 92 is provided and so associated with the field rheostat 88 and the generator 72 as to effectively control the shunting of the different portions of the field rheostat 88.

The leaf spring assembly 92 corresponds in structure to that disclosed in the copending application of C. R. Hanna, et al., Serial No. 203,876, filed April 23, 1938, for Regulators, and assigned to the same assignee as this invention. Without going into a detail discussion of the leaf spring assembly 92 it comprises a plurality of leaf springs 94 arranged in a stack having their fixed ends insulated from each other by suitable insulating material, not shown, and connected by conductors 96 to a plurality of points or taps between the different portions of the field rheostat 88. The opposite ends of the leaf springs 94 carry suitable contact members 98 and are biased into engagement with a stop 100 of any suitable insulating material. The stop 100 is provided with a sloping surface for limiting the motion of the leaves in one direction and for spacing the free ends of the spring leaves 94 out of circuit closing engagement. The driving element 102 carried by movable arm 104 actuates the leaf springs 94 away from the stop when actuated, as will be explained more fully hereinafter.

The magnetic structure 90 employed in conjunction with the leaf spring assembly 92 for controlling the movement of the spring leaves 94 can be of any suitable arrangement. As illustrated, the magnetic structure comprises a core member 106 and a movable armature member 108 carried by the lever arm 104 and a winding 110 which is electrically connected as by conductors 112 and 114 through a variable resistor 116 to the armature 74 of the pilot generator 72. In the embodiment illustrated, the winding 110 is energized by voltage delivered by the generator 72 and the lever arm 104 is actuated in a counter-clockwise direction about its pivot point 118 against the bias of spring member 120 to actuate the driving member 102 against the leaf springs 94 to shunt out predetermined portions of the rheostat 88 in accordance with the voltage delivered by the generator 72.

As illustrated, the system is shown in a de-energized position with the movable electrodes 42 of the slip regulator at a point farthest removed from the fixed electrodes and latched in position. When the switch 16 is closed and power is delivered to the wound rotor motor 10, the movable electrode assembly 42 is unlatched and since the assembly of the movable electrodes is heavier than the counterweight 48 under the pull of gravity, they tend to approach the fixed electrodes 40, thereby reducing the resistance in circuit with the wound rotor of the motor 10. As is well known in the art, this movement of the movable electrodes 42 towards the fixed electrodes 40 can be initially controlled to prevent removal of all of the resistance from the circuit of the wound rotor windings when the motor 10 is initially energized.

As the movable electrodes 42 approach the fixed electrodes 40, it is found that due to the inductive connection of the alternating current torque motor 52 to the three-phase supply conductors 18, 20 and 22 that the alternating current torque motor 52 is energized to produce a torque tending to actuate the shaft 50 and consequently the lever 46 in a clockwise direction, thereby aiding the counterweight 48 in preventing the movable electrodes 42 from contacting the fixed electrodes 40 to short out the resistance in circuit with the wound rotor of motor 10. The alternating current torque motor 52, therefore, produces a slight torque in proportion to the power supplied to the motor 10 to so position the electrodes 42 within the cells of the slip regulator to effectively maintain a predetermined resistance in circuit with the rotor windings of the motor 10. This resistance in circuit with the motor windings 14 would normally determine the idling speed of the motor 10.

The pilot generator 72 is driven by the motor 10 and generates a voltage which is a direct measure of the speed of the motor 10 and which is impressed on the winding 110 of the magnetic structure 90. Since the idling speed of the wound rotor motor 10 controlled by slip regulator 30 is too high for certain applications in industry, the voltage delivered by the pilot generator 72 is utilized to energize the magnetic structure 90 to actuate the movable lever arm 104 to drive the member 102 against the leaf springs 94 and effectively shunt different portions of the field rheostat 88 of the direct current motor 54 in accordance with the voltage delivered by the pilot generator 72. This reduction in the resistance of the field rheostat 88 in circuit with the shunt field winding 78 of motor 54 which is supplied from a separate source of direct current increases the excitation of the shunt field winding 78 to effectively produce a larger torque in the direct current motor 54, whereby its armature 80 tends to rotate in a clockwise direction to cooperate with the alternating current torque motor 52 to effect a further separation of the movable electrodes 42 and the fixed electrodes 40 of the slip regulator 30 to increase the amount of resistance in circuit with the wound rotor 14 of the motor 10, thereby effectively further reducing the idling speed of the motor 10.

The reduction in the speed of the wound rotor motor 10, of course, effects a reduction in the voltage delivered by the pilot generator 72, whereby the magnetic pull on the armature 108 carried by the lever arm 104 is reduced and the bias of the spring member 120 effectively removes the shunt around certain of the portions of the field rheostat 88. The voltage delivered by the generator 72 can be regulated within predetermined limits by manually adjusting the resistor 86 in circuit with the separately excited field winding 76 of the generator 72.

In operation, the leaf spring assembly 92 is usually of such a size that for the desired reduced idling speed of the motor 10, only a portion of the leaf springs 94 are actuated to shunt a part of the field rheostat 88 of the direct current motor 54. Thus for any changes in the idling speed of the motor 10 a change of the voltage delivered by the pilot generator 72 is effective for either shunting more of the resistor sections from the field rheostat 88 or for removing the shunt, depending upon whether or not the change in speed is an increase or a decrease, respectively.

While the direct current torque motor 54 is effective for reducing the idling speed of a wound rotor motor 10 from that normally obtained with an alternating current torque motor, it is, of course, apparent that the effect of the direct current torque motor 54 is substantially limited to the range of normal idling speeds of the wound rotor motor 10. This is because the leaf spring assembly 92 and the magnetic structure 90 associated with the pilot generator 72 and the direct current torque motor 54 are limited as to their action in shunting the resistor 88 to a predetermined voltage delivered by the pilot generator 72, any further increase in the voltage delivered by the generator 72 having no effect on the actuation of the leaf springs 94. Under these conditions, the winding of the magnetic structure 90 is protected, being secured by adjusting the current limiting resistor 116 in circuit therewith.

When a load, not shown, is applied to the wound rotor motor 10, the alternating current torque motor 52 functions in its normal manner to produce a torque tending to actuate the shaft 50 and lever 46 in a clockwise direction to further aid or assist the counterweight 48 to effect a further separation of the movable electrodes 42 and the fixed electrodes 40 of the slip regulator 30 to introduce a predetermined amount of resistance in circuit with the rotor windings 14 of the motor 10 in accordance with the load applied to the motor 10.

As will be readily understood from the description given hereinbefore, by utilizing the control system of this invention a reduction in the idling speed from the idling speed normally obtained in a wound rotor motor is secured together with a sensitive control for maintaining such reduced idling speed without any sacrifice as to the inherent load control characteristics usually associated with such wound rotor motors.

Although this invention has been described with reference to a specific embodiment thereof, it is, of course, not to be limited thereto except insofar as is necessitated by the prior art and the scope of the appended claims.

I claim as my invention:

1. In a control system for a wound rotor motor provided with rotor and stator windings, in combination, a three-phase power source, a rheostat connected in circuit relation with the rotor windings, a torque motor provided with a stator winding for actuating the rheostat in response to changes in load, the stator winding of the torque motor being inductively connected to the three-phase power source, a direct-current motor provided with a field winding disposed to cooperate with the torque motor to actuate the rheostat, means responsive to the speed of the wound rotor motor for controlling the torque of the direct-current motor thereby to control the operation of the rheostat and the speed of the wound rotor motor.

2. In a control system for a wound rotor motor provided with rotor and stator windings, in combination, a three-phase power source, a rheostat connected in circuit relation with the rotor windings, a torque motor provided with a stator winding for actuating the rheostat in response to changes in load, the stator winding of the torque motor being inductively connected to the three-phase power source, a direct-current motor provided with a field winding disposed to cooperate with the torque motor to actuate the rheostat, a direct-current generator driven by the wound rotor motor, means actuated in response to the operation of the generator for controlling the excitation of the direct-current motor to control the torque developed thereby to control the speed of the wound rotor motor.

3. In a control system for a wound rotor motor provided with rotor and stator windings, in combination, a three-phase power source, a rheostat connected in circuit relation with the rotor windings, a torque motor provided with a stator winding for actuating the rheostat in response to changes in load, the stator winding of the torque motor being inductively connected to the three-phase power source, a direct-current motor provided with a field winding mechanically connected with the torque motor and disposed to cooperate therewith to actuate the rheostat, a rheostat connected in circuit relation with the field winding of the direct-current motor, a generator driven by the wound rotor motor for delivering a voltage which is directly proportional to the speed of the wound rotor motor, and means responsive to the voltage of the generator for actuating the rheostat connected in circuit with the field winding for controlling the excitation of the direct-current motor to control the torque developed thereby to control the speed of the wound rotor motor.

4. In a control system for a wound rotor motor provided with rotor and stator windings, in combination, a three-phase power source, a rheostat connected in circuit relation with the rotor windings, a torque motor provided with a stator winding for actuating the rheostat in response to changes in load, the stator winding of the torque motor being inductively connected to the three-phase power source, a direct-current motor provided with a field winding mechanically connected with the torque motor and disposed to cooperate therewith to actuate the rheostat, a rheostat having different portions disposed to be connected in circuit relation with the field winding of the direct-current motor, means associated with the rheostat for shunting the different portions of the rheostat, a direct-current generator driven by the wound rotor motor for delivering a voltage which is a direct indication of the speed of the wound rotor motor, and means responsive to the voltage of the generator for actuating the shunting means associated with the field rheostat of the direct-current motor for controlling the excitation of the direct-current motor to control the torque developed thereby to control the speed of the wound rotor motor.

WILLARD G. COOK.